(12) United States Patent
Tobias

(10) Patent No.: US 7,293,165 B1
(45) Date of Patent: Nov. 6, 2007

(54) BMC-HOSTED BOOT ROM INTERFACE

(75) Inventor: David Francis Tobias, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 531 days.

(21) Appl. No.: 10/406,131

(22) Filed: Apr. 3, 2003

(51) Int. Cl.
*G06F 9/24* (2006.01)
*G06F 15/177* (2006.01)
*G06F 1/24* (2006.01)

(52) U.S. Cl. .............................. 713/1; 713/2; 713/100
(58) Field of Classification Search ...................... 713/1
See application file for complete search history.

(56) References Cited

U.S. PATENT DOCUMENTS

| | | | |
|---|---|---|---|
| 5,230,052 A * | 7/1993 | Dayan et al. ................... | 713/2 |
| 5,727,221 A | 3/1998 | Walsh et al. | |
| 5,764,593 A | 6/1998 | Turpin et al. | |
| 5,802,305 A | 9/1998 | McKaughan et al. | |
| 5,826,015 A * | 10/1998 | Schmidt ....................... | 726/23 |
| 6,493,824 B1 | 12/2002 | Novoa et al. | |
| 6,629,062 B2 | 9/2003 | Coffey et al. | |
| 6,826,714 B2 | 11/2004 | Coffey et al. | |
| 6,950,952 B2 * | 9/2005 | Felsman ..................... | 713/310 |
| 6,954,851 B2 * | 10/2005 | Natu .............................. | 713/2 |
| 7,024,695 B1 | 4/2006 | Kumar et al. | |
| 2003/0041182 A1 * | 2/2003 | Martwick ....................... | 710/1 |
| 2004/0025064 A1 * | 2/2004 | Felsman ..................... | 713/300 |
| 2005/0071461 A1 * | 3/2005 | Mihm et al. ................. | 709/224 |

OTHER PUBLICATIONS

Zircon "Remote Management Controller Data Sheet", 3600-580-00-C, 2001 (QLogic Corporation), pp. 1-5.*
Messmer, Hans-Peter, "The Indispensable PC Hardware Book", Fourth Edition, Great Britain 2002, pp. 34-39, 744-785.
Intel Corporation, "IPMI v1.5 Overview", 2001, pp. 1-4.
Intel Hewlett-Packard NEC Dell, "IPMI—Intelligent Platform Management Interface Specification v1.5", Feb. 20, 2002, Revision 1.1, pp. ii-31.
Q Logic Corporation, "Remote Management Controller—Data Sheet", 36000-580-00 C, pp. 1-5.
Agilent Technologies, "Agilent Technologies eRMC Base 1.0 Technical Specifications", Germany, 2001, pp. 1-4.
Chakravarthi, Srigurunath et al., "A Fine-Grain Clock Synchronization Mechanism for QoS Based Communication on Myrinet", 2001, pp. 1-16, Mississippi State University.
Zircon "Remote Management Controller Data Sheet", 3600-580-00-C, 2001 (QLogic Corporation), pp. 1-5.

* cited by examiner

*Primary Examiner*—Rehana Perveen
*Assistant Examiner*—Stefan Stoynov
(74) *Attorney, Agent, or Firm*—Zagorin O'Brien Graham LLP

(57) ABSTRACT

A baseboard management controller (BMC) integrated circuit hosts a BIOS ROM interface. The BMC includes a bus interface responsive to an access to an address range associated with host operations, e.g., an address range associated with BIOS. The BMC includes an interface coupled to communicate with a remote computer for receiving BIOS updates and/or a BIOS patches from the remote computer. Multiple computers may each include a BMC-hosted BIOS ROM interface and may be coupled to a remote computer for communicating BIOS information between the BMCs and the remote computer.

34 Claims, 4 Drawing Sheets

BMC-HOSTED BOOT ROM INTERFACE

BACKGROUND

1. Field of the Invention

This invention relates to computing systems and more particularly to the boot ROM associated therewith.

2. Description of the Related Art

Computing systems typically include a set of built-in software routines that execute at power up as part of "booting the system" and occur each time the system powers up or is reset. These routines are commonly coded in assembly language, and stored in a nonvolatile memory such as a Read Only Memory (ROM) or a Programmable ROM (PROM) such as an Erasable PROM (EPROM), or an Electrically Erasable PROM (EEPROM). Storage in nonvolatile memory ensures that these routines will always be available, including for booting the system, and will not be damaged by disk failures. However, because Random Access Memory (RAM) is faster than ROM, these routines may be copied from ROM to RAM each time the computer is booted. Many modern computers store these routines in a flash memory, which allows updating these routines, if necessary.

In some computer systems (e.g., Personal Computer Advanced Technology (PC-AT) computers), these routines are included in software referred to as the basic input/output system (BIOS). The BIOS performs various functions, including inventorying, testing, and initializing system components. The BIOS facilitates programmer and user interaction with the system hardware. The operating system and application programs of a computer system can access the BIOS rather than directly manipulating I/O ports, registers and control words of the specific system hardware. The BIOS can be accessed through an interface of software interrupts and contains a plurality of entry points respectively corresponding to the different interrupts.

Computer systems often include expansion printed circuit boards (PCBs) for increasing the capabilities of the system and for connecting to peripheral devices. For example, various multimedia devices are commonly implemented as add-in cards or as integrated circuits for installation on a system board. BIOS extensions, also called ROM extensions, are BIOS routines on an option card that are detected by the system BIOS upon bootup. Typically, the BIOS extensions are provided to the system by a separate ROM, often called an option ROM, with a separate address range.

Referring to FIG. 1, a prior art computer system 100 includes CPU 102 connected to I/O hub 104. The I/O hub 104 may be a Southbridge circuit or other appropriate interface module. Low Pin Count (LPC) Bus 110 connects I/O hub 104 to a BIOS ROM 106 that stores a nonvolatile version of BIOS code. The I/O hub 104 provides the interface between the CPU and Peripheral Component Interconnect (PCI) Bus 112 that connects option ROM 108 to the I/O hub. Upon powering up the system, CPU 102 loads the system BIOS from BIOS ROM 106. During bootup, the system BIOS searches for option cards on PCI Bus 112. The BIOS identifies option ROM 108, and assigns addresses to this ROM extension.

Computer systems that give multiple clients access to the same data or resources are called servers. A server farm is a group of networked servers that reside in a single location. Processes are distributed among these servers to improve performance and reliability of processes running on the individual servers. Each server contains a BIOS ROM and can include multiple option cards. Occasionally, the BIOS and option ROM routines require debug, patches, or updates. After the original BIOS code is deployed in a system, it can be costly and inefficient to locally debug, patch, or update the BIOS ROMs and BIOS extensions in each server. Thus, it would be desirable to provide a simplified mechanism for debugging, updating, and patching the system BIOS and BIOS extensions while reducing the number of system components.

SUMMARY

Accordingly, the invention provides a boot ROM interface hosted by a BMC circuit.

In one embodiment of the invention, the BMC includes a bus interface that responds to an access to an address range associated with the boot operations. In one embodiment, the address range is associated with the system BIOS or BIOS extensions. The BMC may include an interface coupled to receive communications from a remote computer for receiving BIOS updates, BIOS extension updates, BIOS patches, and/or diagnostic instructions from the remote computer.

In one embodiment of the invention, multiple server computers each include a CPU, a BMC-hosted BIOS ROM interface, and at least one communication link between the BMC circuit and the CPU. A remote computer may be coupled to the BMC circuit for communicating BIOS and/or diagnostic information between the BMC and the remote computer. Each server computer can receive BIOS, BIOS extensions, BIOS patch, and/or diagnostic information from a remote computer.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The Intelligent Platform Management Interface (IPMI) architecture specification defines a common interface to the hardware that monitors server physical health characteristics including temperature, voltage, fans, power supplies, and chassis intrusion. For a detailed description of the IPMI architecture, see Intel Corp., Hewlett-Packard Corp., NEC Corp., & Dell Computer Corp., *Intelligent Platform, Management Interface Specification* v1.5, (Feb. 20, 2002), which is incorporated herein by reference. The IPMI standard includes automatic alerting, automatic system shutdown and restart, remote restart and power control capabilities, and asset tracking. The standard also describes an interface for remote management of servers and systems. Managers can determine the health of systems whether the servers are running normally or the servers are in a non-operational state. A characteristic of an IPMI-compliant system is that inventorying, monitoring, logging, and recovery control functions are available independent from the main processors, BIOS, and operating system.

Figure 1:
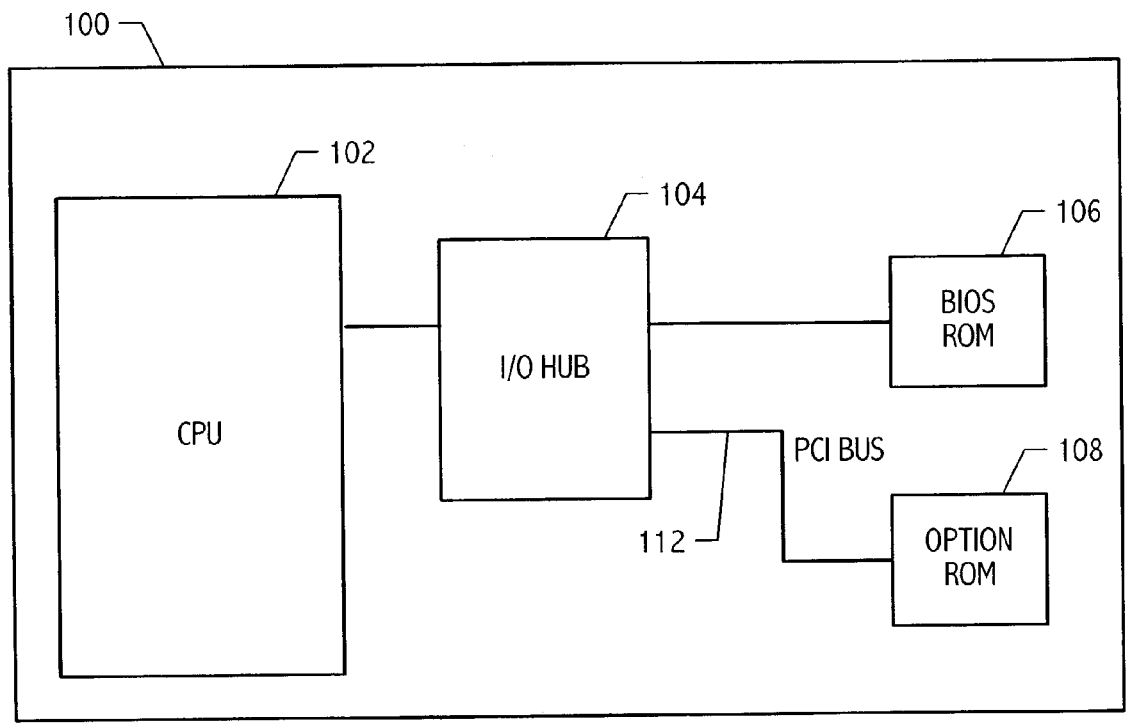
FIG. 1 illustrates an exemplary prior art computer system.
Figure 2:
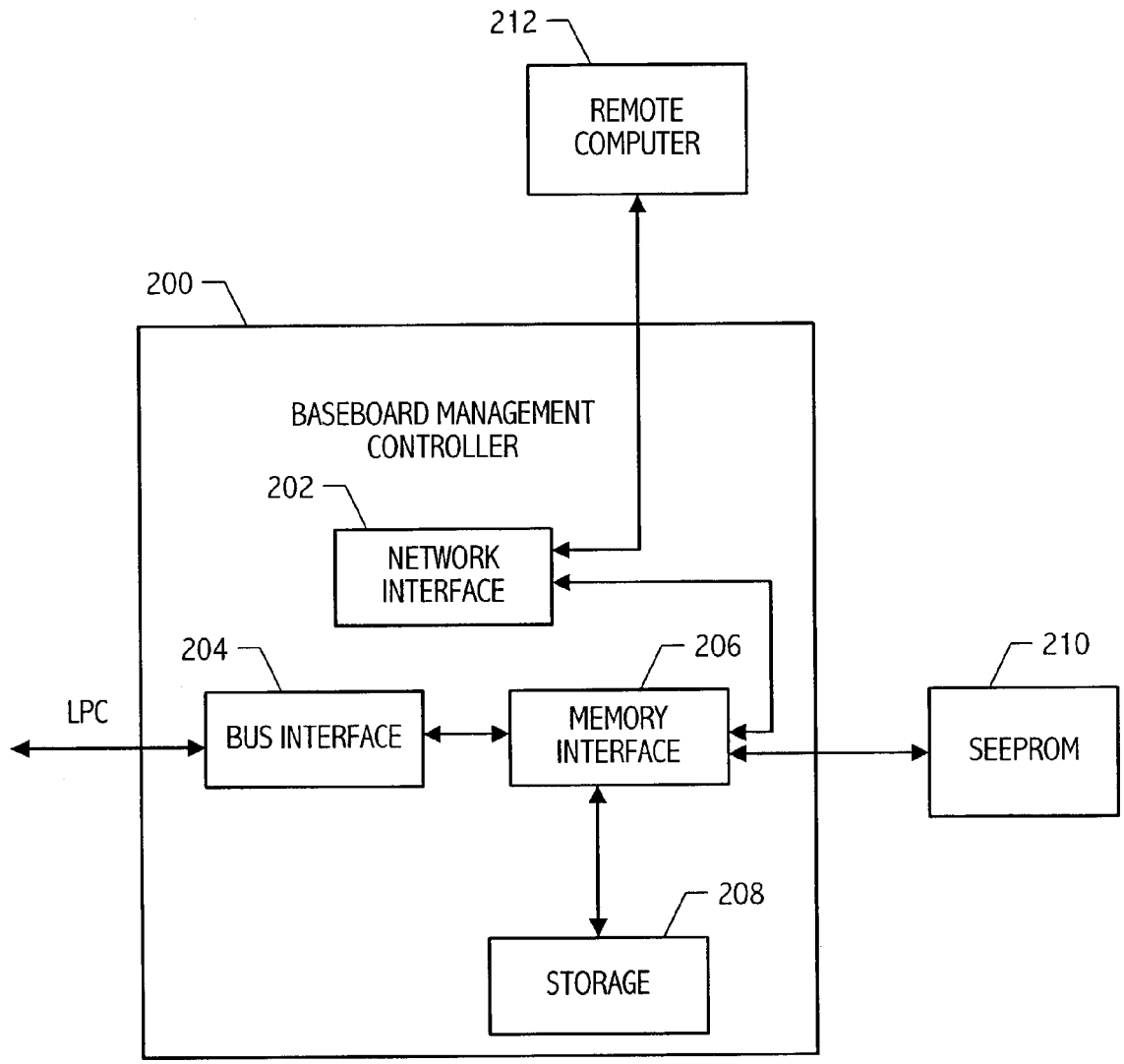
FIG. 2 illustrates an exemplary baseboard management controller circuit according to an embodiment of the present invention.

One of the main elements of an IPMI-compliant system is the baseboard management controller (BMC). FIG. 2 illustrates BMC 200 configured according to an embodiment consistent with the present invention. The BMC is a central management controller that monitors system parameters, logs events, provides recovery control, manages the interface between system management software and platform management hardware, and provides a gateway between system management software and the Intelligent Chassis Management Bus (ICMB) and the Intelligent Platform Management Bus (IPMB) in an IPMI-compliant system. The BMC operates autonomously from the main processors, BIOS, and operating system, and functions even when the system is in a powered-down state. This may be accomplished by providing a power plane that allows power to be supplied independently of power supplied to other system components, including the CPU(s). Note that any sensors that are to be monitored by the BMC while system power is down (e.g., chassis temperature sensors) are also supplied by this "always on" power plane. The BMC is a trusted component that is connected to a central monitoring facility by a LAN connection. The BMC enables remote monitoring and control of the operational state of the system. In one embodiment, the BMC communicates with the main system via the LPC Bus. The BMC functionality may be implemented with a combination of hardware and firmware.

Referring again to FIG. 2, BMC 200 includes bus interface 204 that decodes and responds to bus accesses to an address range associated with boot operations. In an embodiment of the invention, this address range is associated with accesses to the BIOS memory. Note that the address range may be remotely programmable through BMC 200 and is not necessarily limited to less than 1 MB as is typical of BIOS ROM or a BIOS ROM extension. In an embodiment of the invention, BMC 200 can place any amount of code (up to the limit of the BMC to emulate it) anywhere in the system memory map. Bus interface 204 is coupled to memory interface 206. Memory interface 206 is coupled to memories 208 and 210. Either or both of these memories may reside within BMC 200 or external to BMC 200. Serial EEPROM 210 provides nonvolatile storage.

In one embodiment of the present invention, the system BIOS is stored in storage 208, which may be implemented as SRAM. The bus interface 204 decodes accesses to the BIOS ROM and conveys the BIOS ROM request to memory interface 206. Memory interface 206 reads the BIOS from storage 208 and communicates it to bus interface 204 which drives the bus with the data read from corresponding locations in memory 208. The BMC may also read the data from corresponding locations in serial EEPROM 210, or from a combination of locations in storage 208 and serial EEPROM 210. The BMC 200 responds to the bus access as if a BIOS ROM was present on the bus. Thus in one embodiment, the need for a separate BIOS flash ROM is eliminated.

In an embodiment, the bus interface 204 also decodes the option ROM region of the memory map and one or both of storage 208 and serial EEPROM 210 store option ROM code. The BMC 200 can selectively include or remove an option ROM from the system. By including option ROM code within BMC 200, manufacturers save the cost of an option ROM and option ROM decode logic. Instead of providing this additional hardware, manufacturers simply supply the binary image of their option ROM to be included in the memory map of the BMC.

Baseboard management controller 200 includes network interface 202 for communicating with a remote computer 212. Remote computer 212 may download BIOS updates and patches to BMC 200. The bus interface loads these data to the bus when network interface 202 communicates information from the remote computer 212 to the bus interface 204 and to storage 208 and serial EEPROM 210. In another embodiment of the present invention, the BMC 200 implements only the option ROM while the system BIOS resides in a system ROM.

Figure 3:
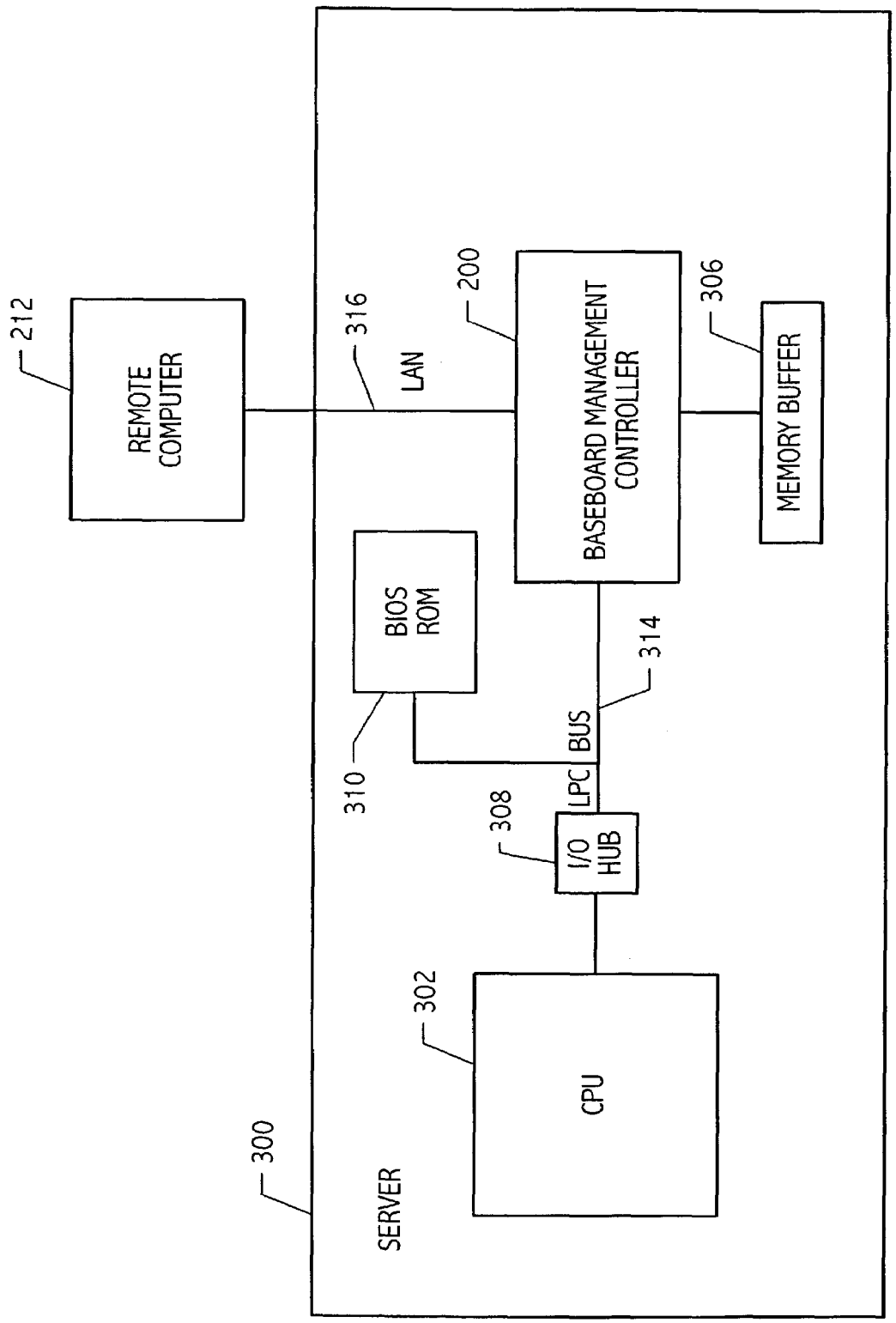
FIG. 3 illustrates an exemplary server computer including a baseboard management controller circuit according to an embodiment of the present invention.

FIG. 3 illustrates a system including server 300 connected to a remote computer 212 by LAN 316. Within server 300, BMC 200 and BIOS ROM 310 communicate with the CPU 302 via LPC Bus 314 and I/O hub 308. Baseboard management controller 200 receives BIOS updates and patches from remote computer 212. Baseboard management controller 200 stores these updates and patches to memory buffer 306. Memory buffer 306 may be any memory module appropriate for storing BIOS code.

Remote computer 212 may be used to debug the system BIOS and BIOS extensions by downloading a debug instruction sequence containing, e.g., a breakpoint. Baseboard management controller 200 may replace code in the system BIOS or BIOS extension that runs on CPU 302 with a trap to the debug instruction sequence. Upon execution, the debug instruction sequence provides BMC 200 with information that can be accessed by remote computer 212. In addition, updates to the option ROM can be downloaded from remote computer 212 to memory buffer 306 to augment or replace the code stored therein. These capabilities may be adapted for other code sequences running on CPU 302 and are not limited to the system BIOS or BIOS extensions. For example, remote computer 212 may download diagnostic instruction sequences to the storage allocated for BIOS or BIOS extensions via BMC 200, for manufacturing testing during the manufacture of IPMI-compliant systems. Baseboard management controller 200 can gather results of these diagnostics and transfer them back to remote controller 212 for analysis.

Figure 4:
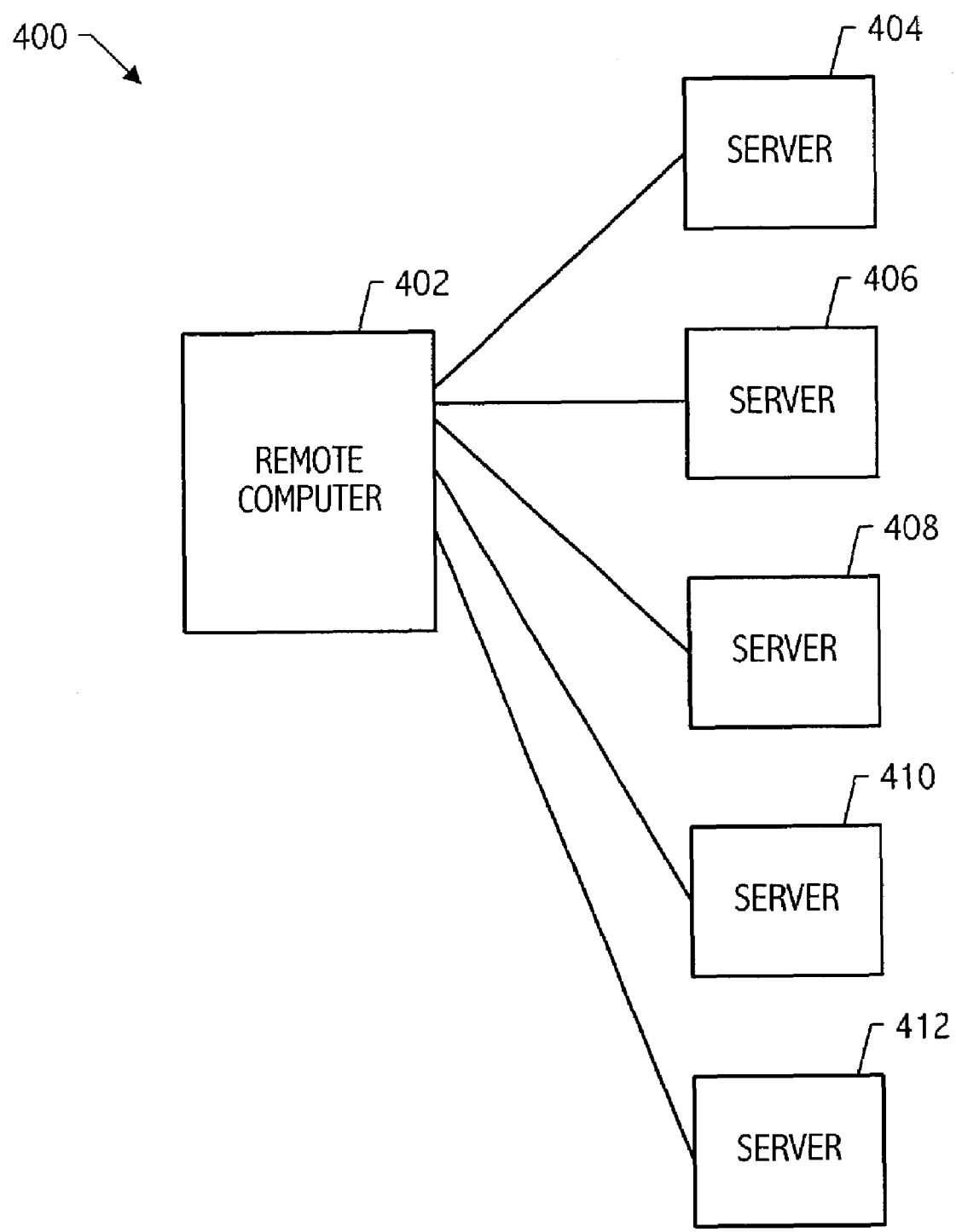
FIG. 4 illustrates a server farm according to an embodiment of the present invention.

FIG. 4 illustrates multiple servers 404-412 connected to remote computer 402 according to an embodiment of the present invention. Remote computer 402 can download identical BIOS images, patches, and updates to some or all of servers 404-412 without requiring local access to each individual server. Thus, updates to a BIOS operating in a server farm can be made in a broadcast mode, simplifying BIOS maintenance. In addition, remote computer 402 can supply different BIOS images, patches, and updates to different servers in the system, as required. This capability may be particularly useful where different servers and even servers from different vendors reside in the same server farm. Similarly, remote computer 402 can centrally receive and monitor debug information provided by execution of debug patch routines.

The description of the invention set forth herein is illustrative, and is not intended to limit the scope of the invention as set forth in the following claims. For example, while specific computing configurations have been described, the individual components may vary. The specific hardware and software components are not critical to understanding the invention described herein and typically varies from system to system. Although the system BIOS and BIOS extensions have been described as the software routines that are loaded into system memory at power up, boot operations and the associated memory and memory range, may vary. Moreover, the applications in which the invention may be applied are not limited to servers and server farms, but extends to other computing systems with system hardware and control and monitoring functions similar to the requirement of server farms. Other variations and modifications of the embodiments disclosed herein, may be made based on the description set forth herein, without departing from the scope and spirit of the invention as set forth in the following claims.

What is claimed is:

1. A baseboard management controller circuit comprising:
   a bus interface configured to respond to a bus access on a bus by an interface circuit coupled between a processor and the bus, the bus access having an address range associated with boot operations of the processor; and
   a memory interface configured to access a memory circuit in response to the bus interface detecting the bus access,
   wherein the memory circuit is not connected to the bus and the bus is coupled to the baseboard management controller circuit and the interface circuit.

2. The baseboard management controller circuit, as recited in claim 1, wherein the address range is associated with at least one of basic input/output system (BIOS) and a BIOS extension.

3. The baseboard management controller circuit, as recited in claim 2,
   wherein the address range is programmable.

4. The baseboard management controller circuit, as recited in claim 2, further comprising:
   a network interface coupled to communicate with a remote computer.

5. The baseboard management controller circuit, as recited in claim 4, wherein the network interface receives any of BIOS, BIOS extension, and BIOS patch instructions from the remote computer.

6. The baseboard management controller circuit, as recited in claim 4, wherein the remote computer receives any of debug information and diagnostic information from the network interface.

7. The baseboard management controller circuit, as recited in claim 2, wherein the baseboard management controller is Intelligent Platform Management Interface (IPMI) compliant.

8. The baseboard management controller circuit, as recited in claim 1, further comprising:
   at least a portion of the memory circuit.

9. The baseboard management controller circuit, as recited in claim 1, wherein the baseboard management controller circuit is configured as a portion of a server within a server farm and is configured to monitor system parameters of the server.

10. The baseboard management controller circuit, as recited in claim 1, wherein the baseboard management controller circuit is coupled to a power plane independent from the processor.

11. The baseboard management controller circuit, as recited in claim 1, wherein the baseboard management controller circuit is configured to communicate with the processor and to communicate with a remote computer via the network interface, the remote computer being configured to receive system parameter information from the baseboard management controller circuit.

12. The baseboard management controller circuit, as recited in claim 1, wherein the bus is a Low Pin Count (LPC) bus.

13. The baseboard management controller circuit, as recited in claim 1, wherein the interface circuit is an input/output bridge device.

14. A computer system comprising a plurality of computers, each computer including:
   a bus;
   a central processing unit;
   an interface circuit coupled between the central processing unit and the bus; and
   a baseboard management controller circuit coupled to the bus, the baseboard management controller circuit comprising:
      a bus interface responsive to an access of the interface circuit in response to a request by the central processing unit to access an address range associated with boot operations of the central processing unit; and
      a memory interface configured to access a memory circuit in response to the bus interface detecting the access of the interface circuit to the address range,
   wherein the memory circuit is not connected to the bus.

15. The computer system, as recited in claim 14, wherein the address range is associated with at least one of basic input/output system (BIOS) and a BIOS extension.

16. The computer system, as recited in claim 15, further comprising:
   a remote computer coupled to the baseboard management controller circuit; and
   a network interface on the baseboard management controller circuit coupled to communicate with the remote computer.

17. The computer system, as recited in claim 16, wherein the remote computer communicates any of BIOS, a BIOS extension, and BIOS patch information to the baseboard management controller circuit.

18. The computer system, as recited in claim 16, wherein the remote computer communicates diagnostic instructions to the baseboard management controller circuit.

19. The computer system, as recited in claim 16, wherein the remote computer is coupled to the plurality of computers.

20. The computer system, as recited in claim 19, wherein the plurality of computers receive information from the remote computer.

21. The computer system, as recited in claim 20, wherein the information is related to any of BIOS, a BIOS extension, and a BIOS patch.

22. The computer system, as recited in claim 20, wherein the information is related to diagnostic instructions.

23. The computer system, as recited in claim 19, wherein the remote computer receives diagnostic information from the plurality of computers.

24. The computer system, as recited in claim 15, wherein the address range is programmable.

25. The computer system, as recited in claim 15, wherein the baseboard management controller circuit is Intelligent Platform Management Interface (IPMI) compliant.

26. The computer system as recited in claim 14,
   wherein the memory circuit contains instructions associated with at least one of BIOS and a BIOS extension.

27. The computer system, as recited in claim 14, wherein the bus is a Low Pin Count (LPC) bus and the interface circuit is an input/output bridge circuit.

28. The computer system, as recited in claim 14, further comprising a boot memory coupled to the bus, the boot memory being responsive to the access by the interface circuit in response to the request by the central processing unit.

29. A method for providing information stored in a computer system comprising:
   storing information associated with boot operations of a processor in storage locations accessible to a memory interface in a baseboard management controller circuit; and
   supplying information stored in the storage locations to a bus coupled to an interface circuit when a bus interface in the baseboard management controller circuit detects a bus access by the interface circuit, the access being in response to a request by the processor to an address range associated with the boot operations of the processor,
   wherein the interface circuit is coupled between the processor and the bus, and
   wherein the storage locations are not connected to the bus.

30. The method, as recited in claim 29, wherein the supplied information includes at least one of basic input/output system (BIOS), a BIOS extension, and a BIOS patch information.

31. The method, as recited in claim 30, further comprising:
   communicating the information associated with boot operations to the baseboard management controller circuit from a remote computer.

32. A method for patching instructions associated with boot operations on a central processor unit comprising:
   receiving a boot patch instruction sequence by a baseboard management controller circuit from a remote computer;
   storing the boot patch instruction sequence in a memory buffer; and
   placing, on a bus, at least a portion of the boot patch instructions in response to a bus interface in the baseboard management controller circuit detecting an access by an interface circuit on the bus to an address range associated with the boot operations of the central processor unit;
   wherein the memory buffer is not coupled to the bus.

33. A baseboard management controller integrated circuit comprising:
   a bus interface means for detecting accesses to a bus, the accesses being in response to a request by a processor and having an address range associated with boot operations of the processor, the processor being coupled to an interface means, and the bus being coupled to the baseboard management controller integrated circuit and the interface means; and
   a memory interface means for providing to the bus interface means contents of a memory circuit not connected to the bus in response to the bus interface means detecting the accesses.

34. The baseboard management controller integrated circuit, as recited in claim 33, further comprising:
   a means for receiving from a remote computer information for storage in the memory circuit.

* * * * *